(12) United States Patent
Sun (10) Patent No.: US 11,598,929 B2
(45) Date of Patent: Mar. 7, 2023

(54) TERMINAL DEVICE, LENS ADJUSTMENT METHOD AND COMPUTER-READABLE STORAGE MEDIUM

(71) Applicant: Beijing Xiaomi Mobile Software Co., Ltd., Beijing (CN)

(72) Inventor: Changyu Sun, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 248 days.

(21) Appl. No.: 16/814,465

(22) Filed: Mar. 10, 2020

(65) Prior Publication Data

US 2021/0124141 A1    Apr. 29, 2021

(30) Foreign Application Priority Data

Oct. 24, 2019   (CN) .......................... 201911019753.6

(51) Int. Cl.
| | |
|---|---|
| *G02B 7/02* | (2021.01) |
| *G02B 7/04* | (2021.01) |
| *H04N 5/247* | (2006.01) |
| *H04M 1/02* | (2006.01) |
| *H04N 5/225* | (2006.01) |

(52) U.S. Cl.
CPC ............... *G02B 7/023* (2013.01); *G02B 7/04* (2013.01); *H04N 5/247* (2013.01); *H04M 1/0264* (2013.01); *H04N 5/2257* (2013.01)

(58) Field of Classification Search
CPC ....... G02B 7/023; G02B 7/04; H04M 1/0264; H04N 5/247; H04N 5/2257

USPC ................................................... 359/813, 814
See application file for complete search history.

(56) References Cited

U.S. PATENT DOCUMENTS

| | | | |
|---|---|---|---|
| 2005/0031328 A1 | 2/2005 | Weng et al. | |
| 2007/0002130 A1 | 1/2007 | Hartkop | |
| 2007/0009250 A1* | 1/2007 | Kim ..................... | H04N 5/2254 |
| | | | 396/144 |
| 2016/0323503 A1 | 11/2016 | Wada | |
| 2019/0392597 A1 | 12/2019 | Feng et al. | |
| 2019/0394373 A1 | 12/2019 | Zhang | |

FOREIGN PATENT DOCUMENTS

| | | |
|---|---|---|
| CN | 101191889 A | 6/2008 |
| CN | 106791391 A | 5/2017 |
| CN | 106850897 A | 6/2017 |
| CN | 106921767 A | 7/2017 |

(Continued)

OTHER PUBLICATIONS

Supplementary European Search Report in the European application No. 20165177.5, dated Aug. 31, 2020.

(Continued)

*Primary Examiner* — Mahidere S Sahle
(74) *Attorney, Agent, or Firm* — Finnegan, Henderson, Farabow, Garrett & Dunner, L.L.P.

(57) ABSTRACT

A terminal device includes: a housing; a screen arranged on the housing; a first lens arranged in the housing and disposed on a back of the screen; and a turnover module arranged on the hack of the screen in the housing and configured to change an orientation of the first lens, so that the first lens faces towards a first direction or a second direction of the screen, the second direction being different from the first direction.

20 Claims, 9 Drawing Sheets

(56) References Cited

FOREIGN PATENT DOCUMENTS

| CN | 108259677 | A |   | 7/2018  |           |
|----|-----------|---|---|---------|-----------|
| CN | 108900676 | A |   | 11/2018 |           |
| CN | 208092591 | U |   | 11/2018 |           |
| CN | 208094613 | U |   | 11/2018 |           |
| CN | 109379465 | A |   | 2/2019  |           |
| CN | 109584741 | A |   | 4/2019  |           |
| CN | 109639869 | A |   | 4/2019  |           |
| CN | 109922243 | A |   | 6/2019  |           |
| CN | 208956102 | U |   | 6/2019  |           |
| CN | 209089023 | U |   | 7/2019  |           |
| CN | 110213408 | A |   | 9/2019  |           |
| CN | 110213408 | A | * | 9/2019  | H04M 1/026 |
| CN | 209419663 | U |   | 9/2019  |           |
| CN | 110581909 | A |   | 12/2019 |           |
| CN | 110602289 | A |   | 12/2019 |           |
| CN | 209897106 | U |   | 1/2020  |           |
| EP | 1 727 355 | A2 |  | 11/2006 |           |
| JP | 2005275126 | A |  | 10/2005 |           |
| KR | 20170004532 | A | | 1/2017  |           |
| KR | 20170057058 | A | | 5/2017  |           |
| WO | WO 2018/165912 | A1 | | 9/2018 |           |
| WO | WO 2019153733 | A1 |  | 8/2019  |           |

OTHER PUBLICATIONS

First Office Action of Chinese Application No. 201911019753.6, dated Aug. 19, 2021.
First Office Action of Korean Application No. 10-2020-7007603, dated Jul. 5, 2021.
English version of International Search Report in International Application No. PCT/CN2020/074265, dated Jul. 15, 2020.
Notice of Reasons for Refusal of Japanese Application No. 2020-513713, dated Jul. 5, 2022.
Gen Li, "Research of the key technologies in laser display system", May 8, 2018, University of Science and Technology of China, China Academic Journal Electronic Publishing House, http://www.cnki.net, 103 pages.
Notice of Reasons for Refusal of Japanese Application No. 2020-513713, dated Dec. 7, 2022.

* cited by examiner

TERMINAL DEVICE, LENS ADJUSTMENT METHOD AND COMPUTER-READABLE STORAGE MEDIUM

CROSS-REFERENCE TO RELATED APPLICATIONS

This application is based upon and claims priority to Chinese Patent Application No. 201.911019753.6, filed on Oct. 24, 2019, the entire content of which is incorporated herein by reference.

TECHNICAL FIELD

The present disclosure relates to the technical field of electronic devices, and more particularly, to a terminal device, a lens adjustment method and a computer-readable storage medium.

BACKGROUND

Along with the development of a terminal technology and popularization of an intelligent terminal device, users are increasingly seeking for a full screen having a high screen-to-body ratio. A front camera of the terminal device occupies a certain space of the screen and reduces the screen-to-body ratio of the terminal device. Presently, setting the front camera as a pop-up type camera or an under-display hole type camera is an important manner for the terminal device to implement the full screen. However, the existing manners for implementing the full screen need to provide a hole on the terminal device, thus exposing the camera to collect environmental light to generate an image. For example, holes are set on sides of adjacent screens of the terminal device to expose the pop-up type camera, and a hole is set on the screen of the terminal device to expose the under-display hole type camera. As a result, user experience is affected.

SUMMARY

The present disclosure provides a terminal device, a lens adjustment method and a computer-readable storage medium.

According to a first aspect of embodiments of the present disclosure, a terminal device includes: a housing; a screen arranged on the housing; a first lens arranged in the housing, and disposed on a hack of the screen; and a turnover module arranged on the back of the screen in the housing and configured to change an orientation of the first lens, so that the first lens faces towards a first direction or a second direction of the screen, the second direction being different from the first direction.

According to a second aspect of embodiments of the present disclosure, a lens adjustment method includes: detecting a current orientation of a first lens arranged in a housing of a terminal device and on a back of a screen of the terminal device; and when a target orientation of the first lens determined by the terminal device does not match the current orientation, adjusting an orientation of the first lens based on a turnover module, the target orientation of the first lens including the first lens facing towards a first direction of the screen and the first lens facing towards a second direction of the screen, the second direction being different from the first direction.

According to a third aspect of embodiments of the present disclosure, a non-transitory computer-readable storage medium has stored thereon instructions that, when executed by a processor of a terminal device, cause the terminal device to perform the lens adjustment method in the second aspect.

It is to be understood that the above general description and detailed description below are only exemplary and explanatory and do not limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Figure 1:
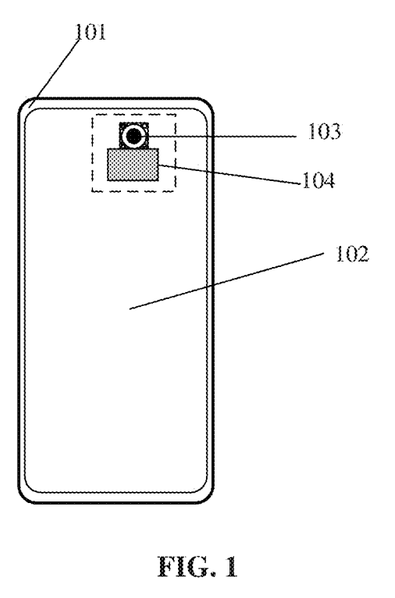
FIG. 1 is a schematic diagram illustrating a terminal device, according to an exemplary embodiment.

FIG. 1 is a schematic diagram illustrating a terminal device, according to an exemplary embodiment. As illustrated in FIG. 1, the terminal device at least includes: a housing 101; a screen 102 arranged on the housing; a first lens 103 arranged in the housing 101 and disposed on a hack of the screen 102; and a turnover module 104 arranged on the back of the screen 102 in the housing 101 and configured to change an orientation of the first lens 103, so that the first lens 103 faces towards a first direction of the screen 102 or a second direction of the screen 102, the second direction being different from the first direction.

As illustrated in FIG. 1, the first lens 103 and the turnover module 104 are within a dotted box, which indicates that both the first lens 103 and the turnover module 104 are hidden on the back of the screen 102. The first lens 103 and the turnover module 104 shown in FIG. 1 are merely for illustrative purposes, and actually may not be seen directly from the outside of the screen 102.

The terminal device may be, e.g., a wearable electronic device or a mobile terminal. The mobile terminal includes a mobile communication device, a notebook and a tablet computer, and the wearable electronic device includes a smart watch, which is not limited in embodiments of the present disclosure.

The screen 102 is configured to display information, and may be a liquid crystal display screen, an Organic Light-Emitting Diode (OLED) display screen and a Cathode Ray Tube (CRT) display screen, which is not limited in embodiments of the present disclosure.

The screen 102 can be installed on at least one surface of the housing 101. For example, when the housing 101 includes six surfaces, the screen 102 can be installed on two adjacent surfaces of the six surfaces, two opposite surfaces of the six surfaces, or any multiple surfaces of the six surfaces, which is not limited in embodiments of the present disclosure.

The first lens 103 is an optical component, and consists of one or more groups of lenses. The first lens 103 can be used for environmental light, also known as ambient light, to enter. The environmental light can be environmental light reflected by an object being photographed.

In an embodiment, the first lens 103 includes a prime lens and a zoom lens, which is not limited in embodiments of the present disclosure. The prime lens can be a lens without a focus changing function, and has the characteristics of fast focusing speed and stable imaging quality. The zoom lens is a focus adjustable lens. During a photographing process, a focal length of the lens can be adjusted according to a distance between the object being photographed and the terminal device, to obtain a better photographing effect.

In embodiments of the present disclosure, the turnover module 104 is fixed in itself but can turn over or flip the first lens 103 in the housing 101, so that the first lens 103 is not fixed in the housing 101. The first lens 103 can face towards different directions by means of the turnover module 104.

In some embodiments, the turnover module 104 can turn over in itself, thereby driving the first lens 103 to turn over. A turnover manner of the turnover module 104 includes an axial type turnover or a spherical turnover. The axial type turnover includes a turnover along an X axis, a turnover along a Y axis, or a turnover along other directional axes. The spherical turnover includes a turnover along any angle or any direction, which is not limited in embodiments of the present disclosure.

In embodiments of the present disclosure, the first lens 103 can face towards the first direction of the screen 102 or the second direction of the screen 102. When the screen 102 is installed on two adjacent surfaces of the housing 101, the first direction of the screen 102 towards which the first lens 103 faces can include a first surface of the two adjacent surfaces towards which the first lens 103 faces, and the second direction of the screen 102 towards which the first lens 103 faces can include a second surface of the two adjacent surfaces towards which the first lens 103 faces.

When the screen 102 is installed on two opposite surfaces of the housing 101, the first direction of the screen 10:2 towards which the first lens 103 faces can include a third surface in the two opposite surfaces towards which the first lens 103 faces, and the second direction of the screen 102 towards which the first lens 103 faces can include a fourth surface in the two opposite surfaces towards which the first lens 103 faces.

In the embodiment, when the first lens 103 faces towards the first direction of the screen 102, the environmental light in the first direction can enter the first lens 103 to photograph the object in the first direction; and when the first lens 103 faces towards the second direction of the screen 102, the environmental light in the second direction can enter the first lens 103 to photograph the object in the second direction.

In the embodiments of the present disclosure, by changing an orientation of the first lens, the same first lens can be used to photograph objects in different directions of the screen. Therefore, it is unnecessary to arrange multiple cameras to photograph objects in different directions, and the number of the cameras can be reduced, so that a space of the terminal device for arranging multiple cameras is reduced, and a structure for providing the lens in the terminal device can further be simplified.

In an embodiment, the housing 101 has a first opening and a second opening, and the second opening and the first opening are respectively arranged on opposite sides of the housing 101. The screen 102 is exposed via the first opening. The first direction faces towards a forward direction of the screen 102, and the second direction faces towards a reverse direction of the screen 102.

When the terminal device is in a first photographing mode, the first lens 103 faces towards the forward direction of the screen 102; and when the terminal device is in a second photographing mode, the first lens 103 faces towards the reverse direction of the screen 102. Environmental light enters the first lens 103 via the second opening.

In embodiments of the present disclosure, the screen 102 is installed on a surface corresponding to the first opening in the housing 101. Art area and a shape of the first opening are matched with those of a display surface of the screen 102. That is, the shape of the first opening can be set based on the shape of the display surface of the screen 102. For example, when the display surface of the screen 102 is rectangular, the first opening can be set as a rectangle; and when the display surface of the screen 102 is square, the first opening can be set as a square.

The area of the first opening can also be set based on the area of the display surface of the screen 102. For example, the area of the display surface of the screen 102 can be set to be equal to that of the first opening, or set the area of the display surface of the screen 102 to be smaller than that of the first opening.

The forward direction facing towards the screen 102 can be a direction facing towards the display surface of the screen 102, and the reverse direction facing towards the screen 102 can be a direction facing towards a back of the display surface of the screen 102. When the first lens 103 faces towards the reverse direction of the screen 102, the environmental light enters the first lens 103 via the second opening. An area and a shape of the second opening are matched with those of a light transmission surface of the first lens 103. That is, when the second opening is formed on the housing 101, the area and the shape of the second opening can be set based on those of the light transmission surface of the first lens 103.

In an embodiment, the area of the second opening can be set to be greater than or equal to that of the light transmission surface of the first lens 103, and the shape of the second opening can be set as to be equal or similar to that of the light transmission surface of the first lens 103, which is not limited in embodiments of the present disclosure.

In embodiments of the present disclosure, when the terminal device is in the first photographing mode, the first lens 103 faces towards the forward direction of the screen 102. At this time, an image collection process of the first lens 103 includes: the first lens 103 is used for image collection within a display interval of a refresh cycle of the screen 102, or, in a case that a display area towards which the first lens 103 faces stops to display, the first lens 103 is used for image collection, which is not limited in embodiments of the present disclosure.

In the embodiments, the terminal device may include two cameras. One camera with the lens facing towards the forward direction of the screen is referred to as a front camera, and the other camera with the lens facing towards the reverse direction of the screen is referred to as a rear camera. The front camera is configured to photograph objects in the forward direction of the screen, and the rear camera is configured to photograph objects in the reverse direction of the screen.

When two cameras are provided in the terminal device, the display may be limited due to a hole being provided on the screen, and a size of the terminal device may be affected due to a large space of the terminal device being occupied, and the cost of the terminal device may be further increased. Therefore, in embodiments of the present disclosure, when the terminal device is in the first photographing mode, the first lens faces towards the forward direction of the screen, and is used for environmental light passing through the forward direction of the screen to enter. In this way, by adjusting the orientation of the first lens, the lens can photograph objects in the forward direction of the screen, and can implement a function of the front camera.

In a case that the terminal device is in the second photographing mode, the first lens faces towards the reverse direction of the screen, and is used for environmental light passing through the second opening to enter. In this way, by adjusting the orientation of the first lens, the lens can photograph objects in the reverse direction of the screen, and can implement a function of the rear camera.

In embodiments of the present disclosure, the first photographing mode can be a front photographing mode, and the second photographing mode can be a rear photographing mode.

In the embodiments, an orientation of the first lens is changed via the turnover module, so that photographing functions in different photographing modes can be implemented. In this way, on one hand, the terminal device is unnecessary to specially provide one corresponding camera for one photographing mode, a space of the terminal device for providing the cameras can be reduced, and a structure for providing the cameras in the terminal device can further be simplified; and on the other hand, as the first lens is disposed in the housing in embodiments of the present disclosure, it is unnecessary to arrange a hole for exposing the first lens on the terminal device when a function of the front camera is implemented, a damage condition due to the fact that the hole is provided on a side of the terminal device to expose the first lens can be reduced, and a display limited condition due to the fact that the hole is provided on a screen to expose the first lens is reduced.

Figure 2:
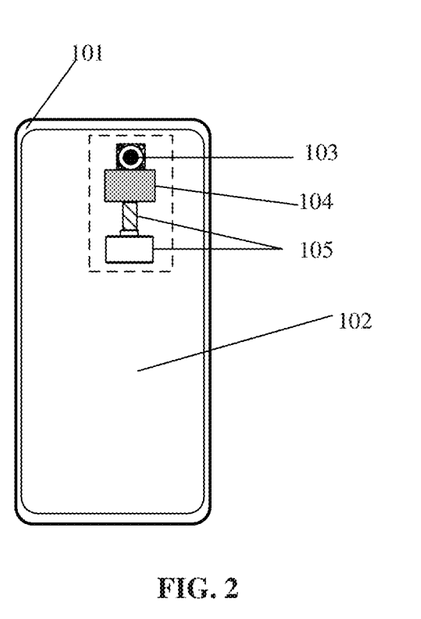
FIG. 2 is a schematic diagram illustrating a terminal device, according to an exemplary embodiment.

In an embodiment, as illustrated in FIG. 2, the terminal device further includes: a driving module 105, configured to drive the turnover module 104 to turn over.

The first lens 103 is installed on the turnover module 104, and configured to change the orientation with the turnover of the turnover module 104.

In embodiments of the present disclosure, the driving module 105 is connected to the turnover module 104, and can drive the turnover module 104 to turn over in the housing 101.

For example, the driving module 105 can be a magnetic type driving module or a motor type driving module.

In an embodiment, the driving module 105 is a motor, and the motor includes a stator and a rotor. The stator is fixed in the housing 101, the rotor is connected to the turnover module 104, and the rotor rotates relatively to the stator. The turnover module 104 is driven to turn over by means of rotation of the rotor.

In the embodiment, a fixed portion in the motor is the stator, and a rotating portion in the motor is the rotor. The rotor provides a driving force to drive the turnover module 104 to turn over. The rotor can include a central shaft rotating in the motor.

For example, the motor can be a servo motor, an asynchronous motor or a step motor, which is not limited in embodiments of the present disclosure.

In embodiments of the present disclosure, the first lens 103 can be fixedly installed on the turnover module 104, and the orientation of the first lens 103 is changed via a turnover of the turnover module 104. The operation of changing the orientation of the first lens 103 includes: changing the orientation of the first lens 103 from a direction facing towards the screen 102 to a direction deviating from the screen 102; or changing the orientation of the first lens 103 from the direction deviating from the screen 102 to the direction facing towards the screen 102.

In the embodiments, the orientation of the first lens 103 can be changed by driving the turnover module 104 via the driving module 105 to turn over, thus the first lens 103 can make a photograph in different photographing modes.

In an embodiment, the terminal device further includes: a detection module, connected to the first lens 103, and configured to position the first lens 103; and a processing module, connected to the detection module and the driving module respectively, and configured to determine, based on the positioning of the first lens 103, whether a current orientation of the first lens 103 is a target orientation, and generate, when the current orientation does not match the target orientation, an adjustment instruction.

The driving module 105 is configured to drive the turnover module 104 to turn over based on the adjustment instruction so as to adjust the orientation of the first lens 103.

In embodiments of the present disclosure, the detection module can position the first lens 103, which includes determining the orientation of the first lens 103. For example, the detection module can determine whether the first lens 103 faces towards the screen 102, the direction deviated from the screen 102, or is in another direction therebetween.

The above processing module can communicate with the detection module and the driving module 105 respectively, receive the positioning of the first lens 103 sent from the detection module, compare the current orientation of the first lens 103 with the target orientation, and generate, when the current orientation of the first lens 103 does not match the target orientation, the adjustment instruction.

In the embodiment, the target orientation of the first lens 103 includes that the first lens 103 faces towards the screen 102 or the orientation of the first lens 103 deviates from the screen 102. In a case that the terminal device is in the first photographing mode, the target orientation of the first lens 103 is that the first lens 103 faces towards the screen 102; and in a case that the terminal device is in the second photographing mode, the target orientation of the first lens 103 is that the orientation of the first lens 103 deviates from the screen 102.

In embodiments of the present disclosure, the processing module sends the generated adjustment instruction to the driving module 105, so as to adjust the orientation of the first lens 103 via the turnover of the turnover module 104 driven by the driving module 105.

The adjustment instruction includes a turnover angle or a turnover displacement for driving the turnover module to turn over, which is not limited in embodiments of the present disclosure.

In the embodiments, with a mutual cooperation among the detection module, the processing module and the driving module 105, the orientation of the first lens 103 is adjusted timely when the current orientation of the first lens 103 does not match the target orientation, so that the first lens 103 can more accurately change the orientation, a turnover error is effectively reduced, and user experience is improved.

In an embodiment, the detection module includes: a first magnetic component, arranged on the first lens 103 and a magnetic field sensor, arranged in the housing 101, and configured to position the first lens 103 via an interaction with the first magnetic component.

In embodiments of the present disclosure, the first magnetic component is configured to generate a magnetic field, and the magnetic field sensor is configured to detect the magnetic field. When the first lens 103 turns over with the turnover module 104, relative position between the first magnetic component and the magnetic field sensor is changed, and the magnetic field detected by the magnetic field sensor is also changed correspondingly. Therefore, the first lens 103 can be positioned according to a magnetic field change of the first magnetic component detected by the magnetic field sensor.

For example, the first magnetic component includes but is not limited to a magnetic component composed of a magnet, and the magnetic field sensor includes but is not limited to a hall sensor.

In the embodiments, a position of the first magnetic component can be detected by means of the change of the magnetic field detected by the magnetic field sensor with the first magnetic component, and thus the first lens 103 can be positioned. Therefore, the current orientation of the first lens 103 can be effectively determined in the turnover process, thereby adjusting the orientation of the first lens 103 timely when the current orientation of the first lens 103 does not match the target orientation.

In another embodiment, for a position where the first magnetic component is provided, with respect to a head and a tail of the first lens 103, the first magnetic component is closer to the head. The head of the first lens 103 is a portion used for the environmental light to enter, and the tail of the first lens 103 is a portion where the environmental light is transmitted to a photosensitive module via the first lens 103. Therefore, by detecting relative positions of the first magnetic component and the magnetic field sensor, the orientation of the first lens 103 can be determined accurately and a detection precision is improved.

In an embodiment, the terminal device further includes: a photosensitive module, arranged on a tail of the first lens 103, disposed integrally with the first lens 103, and configured to generate an image based on environmental light entering via the first lens 103.

In embodiments of the present disclosure, the first lens 103 can be used for the environmental light reflected by the object being photographed to enter, the entered environmental light is focused to the photosensitive module, and the photosensitive module generates the image based on the entered environmental light.

For example, the photosensitive module can include a module formed by a Charge Coupled Device (CCD) or a Complementary Metal Oxide Semiconductor (CMOS), which is not limited in embodiments of the present disclosure.

Figure 3:
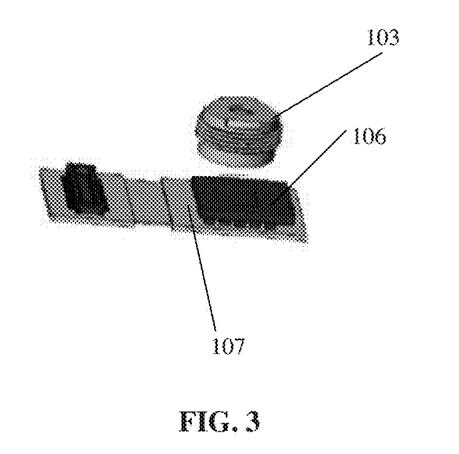
FIG. 3 is a schematic diagram illustrating positions of a photosensitive module and a first lens, according to an exemplary embodiment.

FIG. 3 is a schematic diagram illustrating positions of a photosensitive module 106 and the first lens 103, according to an exemplary embodiment. As illustrated in FIG. 3, the photosensitive module 106 is disposed on the tail of the first lens 103, and the photosensitive module 106 is disposed on a circuit board 107.

Figure 4:
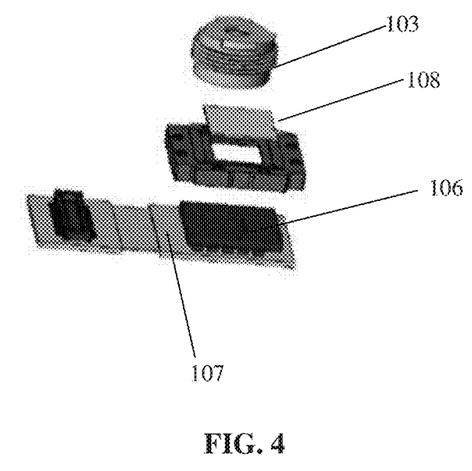
FIG. 4 is a schematic diagram illustrating positions of a photosensitive module, a first lens, and an infrared filter, according to an exemplary embodiment.

FIG. 4 is a schematic diagram illustrating positions of a photosensitive module 106, the first lens 103, and an infrared filter 108, according to an exemplary embodiment. As illustrated in FIG. 4, an image collection module further includes the infrared filter 108 in addition to the first lens 103 and the photosensitive module 106. The infrared filter 108 is disposed between the first lens 103 and the photosensitive module 106, and configured to filter infrared light in the environmental light entering from the first lens 103.

In an embodiment, the terminal device further includes: a focusing module, disposed in the housing 101, and configured to adjust a focal length of the first lens 103 by adjusting a distance between the photosensitive module and the first lens.

In embodiments of the present disclosure, the terminal device can change not only the orientation of the first lens 103 via the turnover module 104, but also the distance between the photosensitive module 106 and the first lens 103 via the focusing module.

In the embodiments, a long distance between the photosensitive module 106 and the first lens 103 indicates a long focal length of the first lens 103, and a short distance between the photosensitive module 106 and the first lens 103 indicates a short focal length of the first lens 103. When the terminal device makes a photograph, if the object being photographed is relatively far, the focal length of the first lens 103 can be shortened; and if the object being photographed is relatively near, the focal length of the first lens 103 can be increased.

In embodiments of the present disclosure, the focal length of the first lens 103 is adjustable, and objects at different distances are photographed by adjusting the focal length of the first lens 103, so that the photographing effect is better.

In some embodiments, the focusing module is configured to adjust the distance between the first lens 103 and the photosensitive module 106 by changing the turnover module 104, thus implementing the focusing.

In some embodiments, the focusing module is configured to adjust the distance between the first lens 103 and the photosensitive module 106 by changing a position of the first lens 103 on the turnover module 104, thus implementing the focusing.

Figure 5:
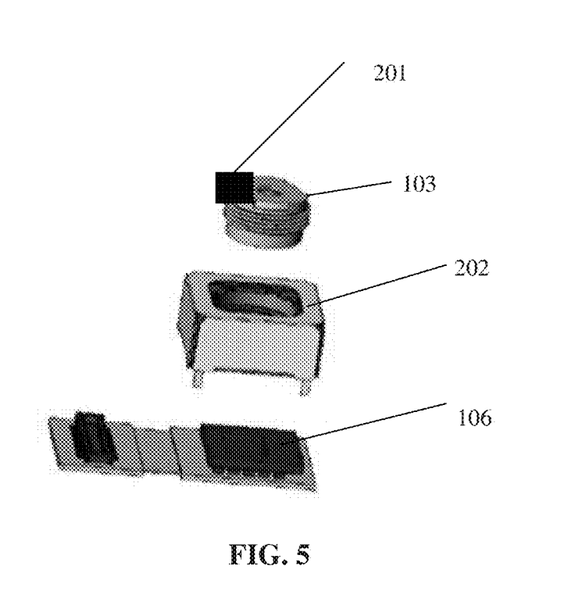
FIG. 5 is a schematic diagram illustrating a focusing module in a terminal device, according to an exemplary embodiment.

FIG. 5 is a schematic diagram illustrating a focusing module in a terminal device, according to an exemplary embodiment. As illustrated in FIG. 5, the focusing module includes: a second magnetic component 201, disposed on the first lens 103; and a third magnetic component 202, disposed between the first lens 103 and the photosensitive module 106, and configured to attract the second magnetic component 201 based on a first power supply signal to shorten the distance between the photosensitive module 106 and the first lens 103; and repulse the second magnetic component 201 based on a second power supply signal to increase the distance between the photosensitive module 106 and the first lens 103.

In embodiments of the present disclosure, a current direction of the first power supply signal is different from that of the second power supply signal, so that a magnetic field in a first magnetic field direction can be generated based on the first power supply signal, and a magnetic field in a second magnetic field direction can be generated based on the second power supply signal. The second magnetic component generates magnetic forces in different directions in magnetic fields in different magnetic field directions, and such magnetic forces can make the first lens and the photosensitive module close or far away.

In an embodiment, a third magnetic component includes a coil, generates the magnetic field in the first magnetic field direction based on a first direction current of the first power supply signal in the coil, and generates the magnetic field in the second magnetic field direction based on a second direction current in the coil.

Under the action of the magnetic field in the first magnetic field direction, the second magnetic component and the third magnetic component generate a mutually attracting magnetic force; and by virtue of the mutually attracting magnetic force, the second magnetic component moves to a direction on which the third magnetic component is provided, thereby shortening the distance between the photosensitive module and the first lens.

Under the action of the magnetic field in the second magnetic field direction, the second magnetic component and the third magnetic component generate a mutually repulsing magnetic force; and by virtue of the mutually repulsing magnetic force, the second magnetic component moves away from the direction on which the third magnetic component is provided, thereby increasing the distance between the photosensitive module and the first lens.

For example, the second magnetic component includes but is not limited to a magnetic component composed of a magnet.

In embodiments of the present disclosure, the terminal device can be provided with a focusing button on a display interface in the photographing mode. When a user operates the focusing button and triggers a focusing function, the terminal device can detect a distance between the terminal device and the object being photographed according to a distance detection apparatus thereon, and input different power supply signals to the third magnetic component based on the distance between the terminal device and the object being photographed.

The distance detection apparatus can measure the distance between the terminal device and the object being photographed via a laser, and can further measure the distance between the terminal device and the object being photographed via an ultrasonic wave, which is not limited in embodiments of the present disclosure.

A preset distance can be set according to an actual requirement, for example, the preset distance can be set as 1 m or 3 m, which is not limited in embodiments of the present disclosure.

In the embodiments, the distance between the photosensitive module 106 and the first lens 103 can be changed via the interaction between the second magnetic component and the third magnetic component, thereby implementing the focusing of the first lens 103 and making the terminal device obtain an image with a better photographing effect.

Figure 6:
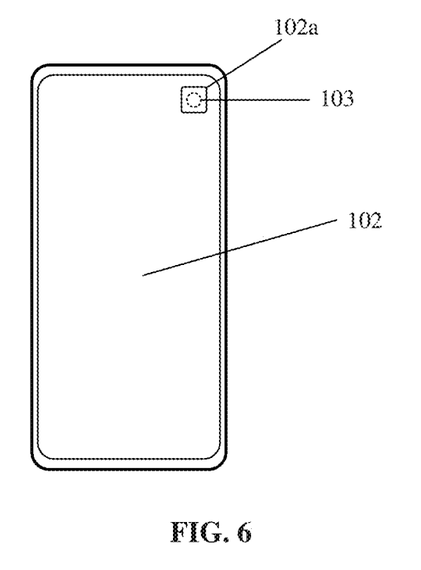
FIG. 6 is a schematic diagram illustrating a terminal device, according to an exemplary embodiment.

In an embodiment, as illustrated in FIG. 6, the screen 102 includes a first display area 102a and a second display area other than the first display area 102a. The first lens 103 is arranged on a back of the first display area 102a. The first display area 102a is in an off state when the first lens 103 faces towards the screen 10:2 and is used for the environmental light to enter.

In embodiments of the present disclosure, in a case of the first photographing mode, the driving module drives the turnover module to turn over, and drives the first lens to turn over, so that the first lens is arranged on a hack of the first display area. At this time, the first display area is in the off state, and the first display area in the off state can transmit the environmental light.

In the embodiments, when the first display area is in the off state, the second display area is configured to display information, so as to display a preview interface; and the object being photographed can be viewed in advance via the preview interface. An area of the first display area is generally smaller than an area of the second display area. When the first display area is in the off state, the influence on the display of the screen can be reduced.

Furthermore, the area of the first display area can be set according to the area of the light transmission surface of the first lens, for example, the area of the first display area can be greater than or equal to that of the light transmission surface of the first lens.

In an embodiment, the second display area is disposed on a bottom of the first display area; or, the second display area is disposed on a top of the first display area; or, the second display area is disposed on a side edge of the first display area.

In embodiments of the present disclosure, the second display area can be disposed on the bottom, top or side edge of the first display area, so positions between the first display area and the second display area can be set according to different requirements.

In an embodiment, when the screen is a rectangular screen, the first display area is disposed on a position of a short edge of the rectangular screen, and the second display area is disposed on a side edge of the short edge. In another embodiment, the first display area is disposed on a position of a long edge of the rectangular screen, and the second display area is disposed on a side edge of the long edge.

Figure 7:
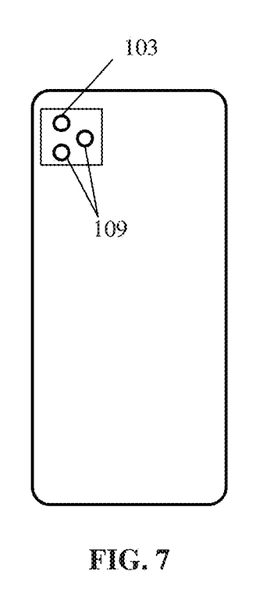
FIG. 7 is a schematic diagram illustrating a terminal device, according to an exemplary embodiment.

In an embodiment, the terminal device further includes: at least one second lens; and the housing further has a third opening. The at least one second lens is exposed via the third opening; and the third opening and the second opening are arranged on a same surface of the housing.

As illustrated in FIG. 7, the terminal device can further be provided with at least one second lens 109 in addition to the first lens 103. The at least one second lens 109 is disposed in a direction away from the screen.

In the embodiment, the at least one second lens 109 can be fixedly disposed on the terminal device, and can further turn over in the housing of the terminal device like the first lens, which is not limited in embodiments of the present disclosure.

In an embodiment, multiple cameras can be disposed on the terminal device, so that requirements of different photographing effects and photographing functions can be met, and user experience is improved.

Figure 8:
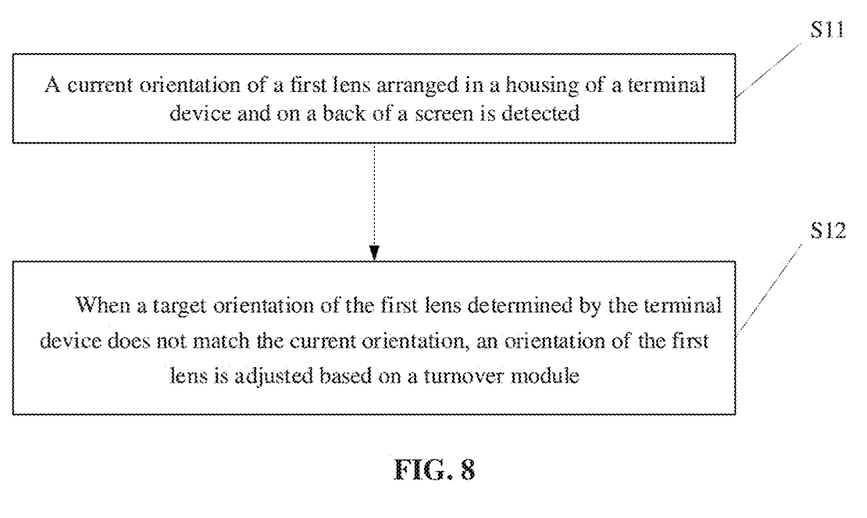
FIG. 8 is a flow chart showing a lens adjustment method, according to an exemplary embodiment.

FIG. 8 is a flow chart showing a lens adjustment method, according to an exemplary embodiment. As illustrated in FIG. 8, the lens adjustment method includes the following steps.

At S11, a current orientation of a first lens arranged in a housing of a terminal device and on a back of a screen is detected.

At S12, when a target orientation of the first lens determined by the terminal device does not match the current orientation, an orientation of the first lens is adjusted based on a turnover module.

The target orientation of the first lens includes that the first lens faces towards a first direction of die screen and the first lens faces towards a second direction of the screen, and the second direction of the screen is different from the first direction of the screen.

In the embodiment, when the target orientation of the first lens faces towards the first direction of the screen, in a case that the target orientation does not match the current orientation, the current orientation of the first lens is adjusted based on the turnover module, so that the first lens faces towards the first direction of the screen; and when the target orientation of the first lens faces towards the second direction of the screen, in the case that the target orientation does not match the current orientation, the current orientation of the first lens is adjusted based on the turnover module, so that the first lens faces towards the second direction of the screen.

In embodiments of the present disclosure, the first lens is disposed on the back of the screen in the housing of the terminal device, the first lens is a hidden camera, and environmental light can enter the first lens via the screen, so as to implement a photographing function.

When objects towards different directions of the screen are photographed, a driving module can adjust the orientation of the first lens, so that the environmental light in different directions of the screen can be collected via the first lens so as to implement the photographing function.

With the utilization of a same first lens in different orientations, photographing functions in different photographing modes corresponding to different directions of the screen can be implemented. In this way, on one hand, a terminal device does not need to specially provide one corresponding camera for each photographing mode, a space of the terminal device for arranging the cameras can be reduced, and a structure for providing the cameras in the terminal device can further be simplified; and on the other hand, since the first lens is disposed in a housing, it is unnecessary to arrange a hole for exposing the first lens on the terminal device when a function of a front camera is implemented, a damage condition due to a hole being provided on a side of the terminal device to expose the first lens can be reduced, a display limited condition due to a hole being provided on a screen to expose the first lens is reduced, and user experience is improved.

In an embodiment, a current photographing mode of the terminal device is detected. When the current photographing mode is a first photographing mode, the first lens faces towards a forward direction of the screen, and the screen is exposed via a first opening of the housing. When the current photographing mode is a second photographing mode, the first lens faces towards a reverse direction of the screen, and environmental light enters the first lens via a second opening of the housing. The second opening and the first opening are respectively arranged on opposite sides of the housing.

The photographing mode of the terminal device includes the first photographing mode and the second photographing mode. The first photographing mode is configured to photograph objects in the forward direction of the screen, and the second photographing mode is configured to photograph object in the reverse direction of the screen.

In a case that the terminal device is in the first photographing mode, the first lens faces towards the forward direction of the screen, and is used for environmental light passing through the forward direction of the screen to enter. In this way, by adjusting the orientation of the first lens, the first lens can photograph objects in the forward direction of the screen, and can implement a function of a front camera.

In a case that the terminal device is in the second photographing mode, the first lens faces towards the reverse direction of the screen, and is used for environmental light passing through the second opening to enter. In this way, by adjusting the orientation of the first lens, the first lens can photograph objects in the reverse direction of the screen, and can implement a function of a rear camera.

In the embodiment, the orientation of the first lens is changed via the turnover module, and the same first lens can be used in different orientations to implement photographing functions in different photographing modes. Therefore, the terminal device does not need to specially provide one corresponding camera for each photographing mode, a space of the terminal device for providing the cameras can be reduced, and a structure for providing the cameras in the terminal device can further be simplified.

In an embodiment, the operation that the orientation of the first lens is adjusted based on the turnover module includes that: the turnover module in the housing is driven to turn over based on a driving module; and based on the turnover of the turnover module, the orientation of the first lens installed on the turnover module is changed.

In the embodiment, the turnover module is driven by the driving module to turn over, so that the first lens can change its orientation with the turnover of the turnover module so as to make a photograph in a corresponding photographing mode.

In an embodiment, the method further includes that: the first lens is positioned via/by a detection module connected to the first lens; the current orientation of the first lens is determined based on the positioning of the first lens; an adjustment instruction is generated when the current orientation does not match the target orientation; and the turnover module is driven based on the adjustment instruction to turn over so as to adjust the orientation of the first lens.

In the embodiment, by positioning the first lens and comparing the current orientation of the first lens with the target orientation, the orientation of the first lens can be adjusted timely, thus effectively reducing an adjustment error, and improving an accuracy for adjusting the first lens.

In an embodiment, the operation that the first lens is positioned via the detection module connected to the first lens includes that: the first lens is positioned via an interaction between a magnetic field sensor in the detection module and a first magnetic component in the detection module disposed on the first lens.

In the embodiment, a position of the first magnetic component can be detected by means of the change of the magnetic field detected by the magnetic field sensor with the first magnetic component, and thus the first lens can be positioned. Therefore, the current orientation of the first lens can be effectively determined in the turnover process, thereby adjusting the orientation of the first lens timely when the current orientation of the first lens does not match the target orientation.

In an embodiment, the method further includes that: based on a photosensitive module integrally disposed with the first lens and arranged on a tail of the first lens, the environmental light passing through the first lens is received; and an image is generated according to the environmental light.

In an embodiment, the method further includes that: a distance between the photosensitive module and the first lens is adjusted via a focusing module disposed in the housing; and a focal length of the first lens is adjusted based on the distance.

In the embodiment, objects at different distances are photographed by adjusting the focal length of the first lens, so that the photographing effect can be better.

In an embodiment, the focusing module includes a second magnetic component disposed on the first lens, and a third magnetic component disposed between the first lens and the photosensitive module.

The operation that a distance between the photosensitive module and the first lens is adjusted via a focusing module disposed in the housing includes that: the distance between the photosensitive module and the first lens is shortened based on mutual attraction between the third magnetic component to which a first power supply signal is charged and the second magnetic component; and the distance between the photosensitive module and the first lens is increased based on mutual repulsion between the third magnetic component to which a second power supply signal is charged and the second magnetic component.

In the embodiment, the distance between the photosensitive module and the first lens can be changed via the interaction between the second magnetic component and the third magnetic component, thereby implementing the focusing of the first lens and making the terminal device obtain an image with a better photographing effect.

The method embodiments correspond to the apparatus embodiments, and have similar beneficial effects.

It is to be noted that the terms "first", "second", and "third" in embodiments of the present disclosure are merely for illustrative and distinguishing purposes, and are not meant to be limiting.

Figure 9:
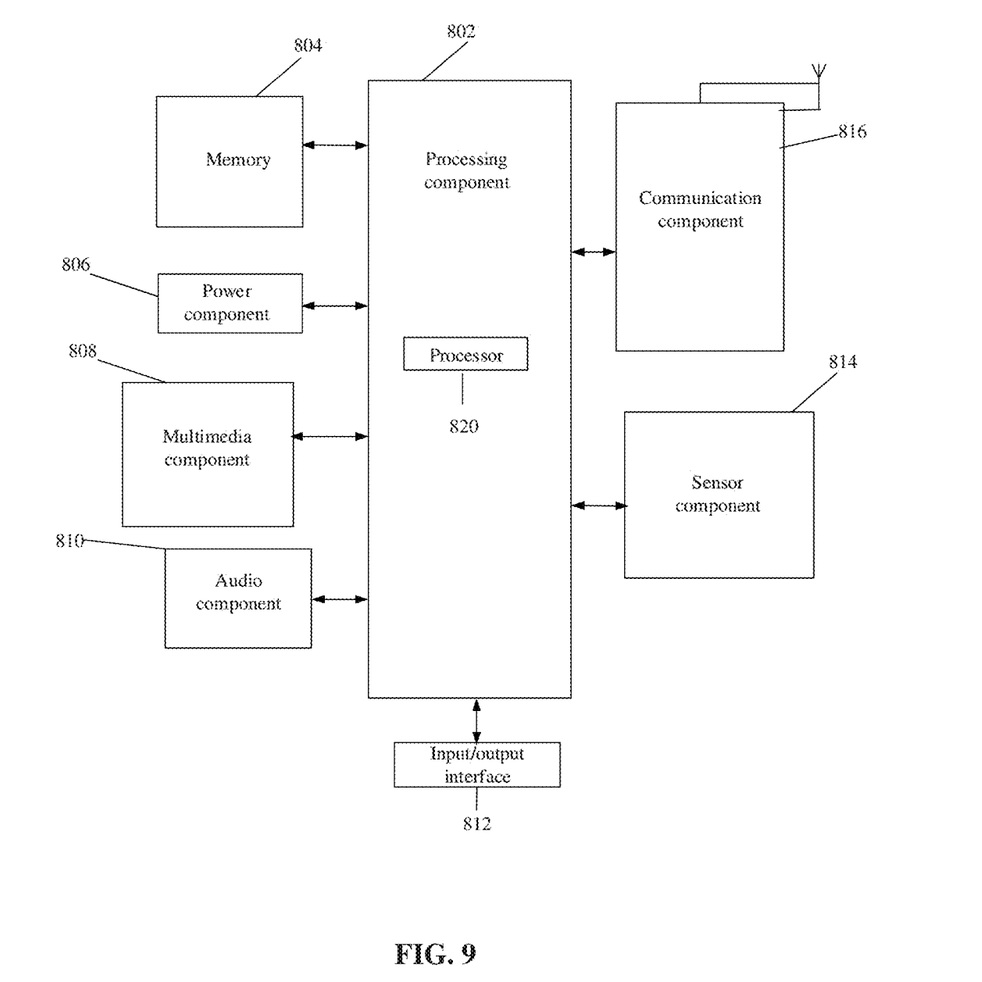
FIG. 9 is a block diagram of a terminal device, according to an exemplary embodiment.

FIG. 9 is a block diagram of a terminal device, according to an exemplary embodiment. For example, the terminal device can be a mobile phone, a computer, a digital broadcast terminal, a messaging device, a gaming console, a tablet, a medical device, exercise equipment, a personal digital assistant, and the like.

Referring to FIG. 9, the terminal device can include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the terminal device, such as the operations associated with display, telephone calls, data communications, camera operations, and recording operations. The processing component 802 can include one or more processors 820 to execute instructions to perform all or part of the steps in the above described methods. Moreover, the processing component 802 can include one or more modules which facilitate the interaction between the processing component 802 and other components. For instance, the processing component 802 can include a multimedia module to facilitate the interaction between the multimedia component 808 and the processing component 802.

The memory 804 is configured to store various types of data to support the operation of the terminal device. Examples of such data include instructions for any applications or methods operated on the terminal device, contact data, phonebook data, messages, pictures, video, etc. The memory 804 can be implemented using any type of volatile or non-volatile memory devices, or a combination thereof, such as a static random access memory (SRAM), an electrically erasable programmable read-only memory (EE-PROM), an erasable programmable read-only memory (EPROM), a programmable read-only memory (PROM), a read-only memory (ROM), a magnetic memory, a flash memory, a magnetic or optical disk.

The power component 806 provides power to various components of the terminal device. The power component 806 can include a power management system, one or more power sources, and any other components associated with the generation, management, and distribution of power in the terminal device.

The multimedia component 808 includes a screen providing an output interface between the terminal device and the user. In some embodiments, the screen can include a liquid crystal display (LCD) and a touch panel (TP). If the screen includes the touch panel, the screen can be implemented as a touch screen to receive input signals from the user. The touch panel includes one or more touch sensors to sense touches, swipes, and gestures on the touch panel. The touch sensors cannot only sense a boundary of a touch or swipe action, but also sense a period of time and a pressure associated with the touch or swipe action.

The audio component 810 is configured to output and/or input audio signals. For example, the audio component 810 includes a microphone (MIC) configured to receive an external audio signal when the terminal device is in an operation mode, such as a call mode, a recording mode, and a voice recognition mode. The received audio signal can be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons can include, but are not limited to, a home button, a volume button, a starting button, and a locking button.

The sensor component 814 includes one or more sensors to provide status assessments of various aspects of the terminal device. For instance, the sensor component 814 can detect an open/closed status of the terminal device, and relative positioning f components, e.g., the component is the display and the keypad of the terminal device. The sensor component 814 can further detect a change in position of the terminal device or a component of the terminal device, a presence or absence of user contact with the terminal device, an orientation or an acceleration/deceleration of the terminal device, and a change in temperature of the terminal device. The sensor component 814 can include a proximity sensor configured to detect the presence of nearby objects without any physical contact. The sensor component 814 can also include a light sensor, such as a CMOS or CCD image sensor, for use in imaging applications. In some embodiments, the sensor component 814 can also include an accelerometer sensor, a gyroscope sensor, a magnetic sensor, a pressure sensor, or a temperature sensor.

The communication component 816 is configured to facilitate communication, wired or wirelessly, between the terminal device and other devices. The terminal device can access a wireless network based on a communication standard, such as 4G, or 5G, or a combination thereof. In one exemplary embodiment, the communication component 816 receives a broadcast signal or broadcast associated information from an external broadcast management system via a broadcast channel. In one exemplary embodiment, the communication component 816 further includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In exemplary embodiments, the terminal device can be implemented with one or more application specific integrated circuits (ASICs), digital signal processors (DSPs), digital signal processing devices (DSPDs), programmable logic devices (PUN), field programmable gate arrays (FPGAs), controllers, micro-controllers, microprocessors, or other electronic components, for performing the above described methods.

A non-transitory computer-readable storage medium is provided; and when an instruction in the storage medium is executed by a processor of a terminal device, the terminal device is caused to perform one or more of the above described methods.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A terminal device, comprising:
a housing;
a screen arranged on the housing;
a first lens arranged in the housing and disposed on a back of the screen; and
a turnover module arranged on the back of the screen in the housing and configured to change an orientation of the first lens, so that the first lens faces towards one of a first direction or a second direction of the screen, wherein the first direction faces towards a forward direction of the screen, and the second direction faces towards a reverse direction of the screen;
wherein the first lens is configured to collect an image within a display interval of a refresh cycle of the screen in response to the first lens facing towards the first direction of the screen.

2. The terminal device of claim 1, wherein:
the housing has a first opening and a second opening arranged on opposite sides of the housing, respectively;
the screen is exposed via the first opening; and
when the terminal device is in a first photographing mode, the first lens faces towards the forward direction of the screen; and when the terminal device is in a second photographing mode, the first lens faces towards the reverse direction of the screen, and environmental light enters the first lens via the second opening.

3. The terminal device of claim 1, comprising:
a driving module configured to drive the turnover module to turn over;
wherein the first lens is installed on the turnover module, and is configured to change the orientation with a turnover of the turnover module.

4. The terminal device of claim 3, further comprising:
a detection module connected to the first lens and configured to position the first lens; and
a processing module connected to the detection module and the driving module respectively, and configured to determine whether a current orientation of the first lens is a target orientation based on a positioning of the first lens, and to generate an adjustment instruction when the current orientation does not match the target orientation;
wherein the driving module is configured to drive the turnover module to turn over based on the adjustment instruction to adjust the orientation of the first lens.

5. The terminal device of claim 4, wherein the detection module comprises:
a first magnetic component arranged on the first lens; and
a magnetic field sensor arranged in the housing and configured to position the first lens via an interaction with the first magnetic component.

6. The terminal device of claim 1, further comprising:
a photosensitive module arranged on a tail of the first lens and disposed integrally with the first lens, and configured to generate an image based on environmental light entering via the first lens.

7. The terminal device of claim 6, further comprising:
a focusing module disposed in the housing and configured to adjust a focal length of the first lens by adjusting a distance between the photosensitive module and the first lens.

8. The terminal device of claim 7, wherein the focusing module comprises:
a second magnetic component disposed on the first lens; and
a third magnetic component disposed between the first lens and the photosensitive module, and configured to attract the second magnetic component based on a first power supply signal to shorten the distance between the photosensitive module and the first lens; and repulse the second magnetic component based on a second power supply signal to increase the distance between the photosensitive module and the first lens.

9. The terminal device of claim 1, wherein:
the screen comprises a first display area and a second display area other than the first display area;
the first lens is arranged on a back of the first display area; and
the first display area is in an off state when the first lens faces towards the screen and is used for the environmental light to enter.

10. The terminal device of claim 9, wherein the second display area is disposed on one of a bottom of the first display area, a top of the first display area; or a side edge of the first display area.

11. The terminal device of claim 2, further comprising:
at least one second lens;
wherein the housing further includes a third opening; the at least one second lens is exposed via the third opening; and the third opening and the second opening are arranged on a same surface of the housing.

12. A lens adjustment method, comprising:
detecting a current orientation of a first lens arranged in a housing of a terminal device and on a back of a screen of the terminal device; and when a target orientation of the first lens determined by the terminal device does not match the current orientation, adjusting an orientation of the first lens based on a turnover module;

wherein the target orientation of the first lens comprises the first lens facing towards a first direction of the screen and the first lens facing towards a second direction of the screen, the first direction facing towards a forward direction of the screen, the second direction facing towards a reverse direction of the screen, the first lens being configured to collect an image within a display interval of a refresh cycle of the screen in response to the first lens facing towards the first direction of the screen.

13. The method of claim 12, further comprising:
detecting a current photographing mode of the terminal device;
when the current photographing mode is a first photographing mode, facing, by the first lens, towards a forward direction of the screen, and exposing the screen via a first opening of the housing; and
when the current photographing mode is a second photographing mode, facing, by the first lens, towards a reverse direction of the screen, wherein environmental light enters the first lens via a second opening of the housing,
wherein the second opening and the first opening are respectively arranged on opposite sides of the housing.

14. The method of claim 12, wherein the adjusting an orientation of the first lens based on a turnover module comprises:
driving the turnover module in the housing to turn over based on a driving module; and
changing the orientation of the first lens installed on the turnover module based on a turnover of the turnover module.

15. The method of claim 14, further comprising:
positioning, by a detection module connected to the first lens, the first lens;
determining the current orientation of the first lens based on the positioning of the first lens;
generating an adjustment instruction when the current orientation does not match the target orientation; and
driving the turnover module to turn over based on the adjustment instruction to adjust the orientation of the first lens.

16. The method of claim 15, wherein the positioning the first lens by a detection module connected to the first lens comprises:
positioning the first lens via an interaction between a magnetic field sensor in the detection module and a first magnetic component in the detection module arranged on the first lens.

17. The method of claim 12, further comprising:
based on a photosensitive module integrally disposed with the first lens and arranged on a tail of the first lens, receiving environmental light passing through the first lens; and generating an image according to the environmental light.

18. The method of claim 17, further comprising:
adjusting, by a focusing module disposed in the housing, a distance between the photosensitive module and the first lens; and
adjusting a focal length of the first lens based on the distance.

19. The method of claim 18, wherein the focusing module comprises a second magnetic component disposed on the first lens and a third magnetic component disposed between the first lens and the photosensitive module, and the adjusting a distance between the photosensitive module and the first lens by a focusing module disposed in the housing comprises:
shortening the distance between the photosensitive module and the first lens based on mutual attraction between the third magnetic component to which a first power supply signal is charged and the second magnetic component; and
increasing the distance between the photosensitive module and the first lens based on mutual repulsion between the third magnetic component to which a second power supply signal is charged and the second magnetic component.

20. A non-transitory computer-readable storage medium having stored thereon instructions that, when executed by a processor of a terminal device, cause the terminal device to perform a lens adjustment method, the method comprising:
detecting a current orientation of a first lens arranged in a housing of the terminal device and on a back of a screen of the terminal device; and
when a target orientation of the first lens determined by the terminal device does not match the current orientation, adjusting an orientation of the first lens based on a turnover module;
wherein the target orientation of the first lens comprises the first lens facing towards a first direction of the screen and the first lens facing towards a second direction of the screen, the first direction facing towards a forward direction of the screen, the second direction facing towards a reverse direction of the screen, the first lens being configured to collect an image within a display interval of a refresh cycle of the screen in response to the first lens facing towards the first direction of the screen.

* * * * *